(12) United States Patent
Schmidt et al.

(10) Patent No.: US 9,205,819 B2
(45) Date of Patent: Dec. 8, 2015

(54) ELECTRONIC CONTROL DEVICE FOR A BRAKING SYSTEM, SUITABLE FOR A DISTANCE CONTROL SYSTEM

(75) Inventors: Robert Schmidt, Kelkheim (DE); Joachim Bohn, Hundsangen (DE); Michael Hitzel, Rödermark (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 247 days.

(21) Appl. No.: 13/575,864

(22) PCT Filed: Jan. 28, 2010

(86) PCT No.: PCT/EP2010/051029
§ 371 (c)(1),
(2), (4) Date: Oct. 15, 2012

(87) PCT Pub. No.: WO2011/091849
PCT Pub. Date: Aug. 4, 2011

(65) Prior Publication Data
US 2013/0026818 A1    Jan. 31, 2013

(51) Int. Cl.
*B60T 13/18* (2006.01)
*B60T 8/36* (2006.01)
(Continued)

(52) U.S. Cl.
CPC .................. *B60T 8/36* (2013.01); *B60T 8/4059* (2013.01); *B60T 8/4872* (2013.01); *B60T 13/18* (2013.01); *B60T 13/20* (2013.01)

(58) Field of Classification Search
CPC ......... B60T 8/00; B60T 8/175; B60T 8/1755; B60T 8/176; B60T 8/1761; B60T 8/1812; B60T 8/1831; B60T 13/00; B60T 13/18; B60T 13/167; B60T 13/20; B60T 8/36; B60T 8/4054; B60T 8/4059; B60T 8/4872

USPC ................ 303/3, 11, 15, 113.1, 115.4, 116.1, 303/119.2, DIG. 1, DIG. 2
See application file for complete search history.

(56) References Cited

U.S. PATENT DOCUMENTS

| | | | | |
|---|---|---|---|---|
| 6,082,830 A | * | 7/2000 | Volz et al. .................. | 303/113.4 |
| 6,155,654 A | * | 12/2000 | Oyama ...................... | 303/117.1 |

(Continued)

FOREIGN PATENT DOCUMENTS

| | | |
|---|---|---|
| DE | 43 17 760 A1 | 1/1994 |
| DE | 196 27 437 A1 | 1/1998 |

(Continued)

OTHER PUBLICATIONS

Machine Translation of DE-4317760.*

(Continued)

*Primary Examiner* — Melody Burch
(74) *Attorney, Agent, or Firm* — Brinks Gilson & Lione

(57) ABSTRACT

An electronic control device for a pressure controller, by way of which solenoid valves for pressure control are actuated with current via an actuating electronic system, and having a pump assembly is actuated as a function of a pressure request, which generates a volumetric flow with a periodically fluctuating amplitude. The wheel brake circuit isolating valve, during an active pressure build-up, discharging part of the delivery volume into a reservoir volume, at least in the case of a control operation which performs an intervention for driving stability which is not critical to safety, if the pressure which is built up by the assembly is higher than the pressure which is to be set, the electric coil current for the actuation of the isolating valve is modulated and the periodic actuation being interrupted at least when the control device has to carry out an intervention for driving stability which is critical to safety.

7 Claims, 2 Drawing Sheets

(51) Int. Cl.
  *B60T 8/40* (2006.01)
  *B60T 8/48* (2006.01)
  *B60T 13/74* (2006.01)
  *B60T 13/20* (2006.01)

(56) References Cited

U.S. PATENT DOCUMENTS

| | | | |
|---|---|---|---|
| 6,419,329 B1 * | 7/2002 | Buschmann et al. | 303/113.1 |
| 7,461,906 B2 * | 12/2008 | Baechle et al. | 303/11 |
| 2008/0238188 A1 * | 10/2008 | Burkhard et al. | 303/113.2 |
| 2010/0226793 A1 | 9/2010 | Beck | |

FOREIGN PATENT DOCUMENTS

| | | |
|---|---|---|
| DE | 10 2007 032 949 A1 | 1/2009 |
| DE | 10 2008 018 818 A1 | 10/2009 |
| EP | 0400507 A2 * | 12/1990 |
| EP | 0 743 233 A2 | 11/1996 |

OTHER PUBLICATIONS

International Search Report—PCT/EP2010/051029—Oct. 28, 2010.

Chinese Examination Report—Mar. 27, 2014.

* cited by examiner

ELECTRONIC CONTROL DEVICE FOR A BRAKING SYSTEM, SUITABLE FOR A DISTANCE CONTROL SYSTEM

CROSS-REFERENCE TO RELATED APPLICATIONS

This application claims priority to PCT International Application No. PCT/EP2010/051029, filed Jan. 28, 2010.

FIELD OF THE INVENTION

The invention relates to an electronic control device particularly adapted for motor vehicle applications.

BACKGROUND OF THE INVENTION

DE 10 2007 032 949 (and related US 2010/0226793) discloses an electronic brake pressure control assembly with analog controllable solenoid valves (what are known as pulse-width modulated (PWM) valves). According to the design of solenoid valves, an electric valve current flows through an electric magnet coil for opening and closing the valve, which magnet coil magnetically actuates what is known as the valve plunger which controls the hydraulic fluid volumetric flow. Such valves are used as inlet valves or isolating valves within a motor vehicle wheel brake pressure control system. For an active pressure build-up (independent pressure build-up without brake actuation by the driver), the brake pressure control assembly comprises a pressure build-up assembly (pump) which is driven by an electric motor. The mechanical construction of the pump assembly may be in the form of a reciprocating piston pump. This type of pump can comprise two or more pistons. Especially where small adjustments of wheel brake hydraulic actuation pressures are desired, it has been shown that fluctuations in the delivered pressure volume at the outlet of the pump can occur, especially in the case of pumps with a few number of pistons, which fluctuations make sufficiently accurate pressure setting by the electronic valve control means difficult. This is especially disruptive in the case of distance control systems such as for ACC (adaptive cruise control) systems, since even comparatively small pressure fluctuations can be sensed by the driver.

The present invention is based on the object of specifying an electronic control device which comprises a method, by way of which the volumetric flow which is generated by the pump assembly can be smoothed and in the process the reliability of other control functions which do not require a volumetric flow which is smoothed to this extent is not impaired.

According to the invention, this object is achieved by the electronic control device described and claimed herein.

The electronic control device according to the present invention includes a control device which carries out a pressure control operation in motor vehicle braking systems and by way of which solenoid valves which can be driven and controlled by electric current via an actuating electronic system are actuated for pressure control. The solenoid valves are used for at least one wheel brake circuit isolating valve, at least one wheel brake pressure inlet valve, and at least one wheel brake pressure outlet valve. A pump assembly which generates a very accurately metered volumetric flow with a periodically fluctuating amplitude at the outlet of the assembly is actuated (active pressure build-up) as a function of a pressure request, as is the case, for example, in a distance control (ACC) operation. Corresponding control operations are called control operations which perform an intervention for driving stability control which is not critical to safety. Here, the wheel brake circuit isolating valve provides a pressure limiting function for the associated wheel brake circuit in such a way that excess volume of brake fluid in the brake circuit is discharged in a metered manner into a connected reservoir volume by the valve which is in the control mode. The pressure in the brake circuit is therefore determined by the pump performance in conjunction with the quantity of the volume outflow at the isolating valve.

According to the invention, firstly the electric coil current for the actuation of the isolating valve is modulated periodically, the cycle of the modulation corresponding to a major cycle of the volumetric or pressure fluctuation which is caused by the pump assembly. The fluctuations in the delivery volume which are generated by the pump assembly can be greatly reduced or even suppressed virtually completely by this measure, without there having to be mechanical means, such as cascade baffles, connected with the pump outlet. Secondly, monitoring is carried out as to whether a control operation which represents an intervention for driving stabilization which is critical to safety has to be carried out, such as skid control, antilock brake system (ABS), or road handling control (ESP, ESC). If this is the case, the solenoid valve which is used for smoothing the pump flow is at least temporarily no longer actuated periodically. The list of the above control operations critical to safety preferably also comprises further control functions which primarily have an influence on the driving stability.

A determination of the cycle of the isolating valve modulation is preferably brought about by a position detection means which is arranged on the pump assembly or on an associated electric motor. According to a first preferred embodiment, the position detection means is preferably a displacement or angle sensor which is connected to a movable part of the pump assembly. Suitable modulation of the isolating valve current is preferably carried out with a curve in accordance with the position of the eccentric component or the piston of the pump assembly, or the phase position (angular position) of a motor armature which is driving the pump, the shape of which curve has to be selected suitably as a function of the desired correction quality and the options in terms of switching technology. Here, the progression of the curve and its influence on the elimination of the volumetric flow fluctuations can readily be determined experimentally. It is expedient that the theoretically optimum progression of the curve is simplified in order to implement it electrically in a relatively simple manner. The curve for the current modulation is therefore preferably a rectangular, triangular, or sine curve. The angular position of the pump assembly or the motor which actuates the assembly can be produced, for example, according to the method which is described in DE 10 2008 018 818.

According to a further preferred embodiment for a position detection means, it is a device which determines the rotor position of a brushlessly actuated electric motor. In the case of a brushlessly actuated electric motor with a position sensor, the sensor signal or the electronics for the motor, for example, can be used to detect the rotor position. In the case of a brushless electric motor without position sensors, the rotor position of the electric motor can be obtained, for example, from the signals of the motor actuation electronics.

According to one embodiment which is likewise preferred as an alternative to the position detection means, the cycle for the pressure modulation is not derived by way of a position detection means on the pump assembly or its driving motor, but rather from the actuating electronic system for the isolating valve current, that is to say directly via the pressure profile or by evaluation of another pressure-dependent signal (for example, from a pressure sensor). The magnetic flux in the region of the actuating magnetic field of the fluid valve which is used for monitoring the fluctuations allows conclusions to be made about the pump fluctuations, since they act via the fluid connecting lines on the plunger of the valve. The flux change which is caused is preferably determined via the induction signal by means of a current loop in the magnetic circuit of the fluid valve. The fluid valve which is used for determining the pressure is connected hydraulically, in particular, to the outlet side of the pump. The evaluation of the induction signal allows a conclusion to be made about the cycle of the pressure fluctuations, since the cycle of the induction signal is substantially consistent with the cycle of the pressure fluctuations.

In addition to the above-described measures, the pump assembly performance can expediently be set or adjusted by way of a controller in a manner which is additionally suitable for optimizing the control operation. To this end, the motor current is particularly preferably modulated in a suitable way while the motor is revolving, as is described in DE 10 2008 018 818.

As has already been described further above, the magnetic field, more precisely the magnetic flux, changes in the region of the valve coil in the case of a plunger movement which is caused by a periodic or else non-periodic pressure change at the solenoid valve which is used for measuring the pressure (differential pressure change). According to a first preferred embodiment, this change can be determined by way of a current loop in the region of the coil magnetic field or directly via the actuating coil. In what is known as the TPM (for "Tappet Position Monitoring") method, the position of the valve plunger or the plunger force is preferably set by the actuating electronic system by means of a control operation to a defined setpoint value. Here, in particular, an induction signal of the current loop which is recorded in the region of the valve coil is used as an actual value. An evaluation of the plunger reaction in a particularly sensitive manner is possible when the plunger is in or close to a force equilibrium between magnetic force (minus or plus the spring force) and hydraulic force. If the forces lie far apart from one another, the plunger cannot react, or cannot react sufficiently sensitively, to a pressure change. It can then be the case that the plunger reacts to only a minimum extent to a pressure change on the valve, without the plunger position changing perceptibly. According to one preferred embodiment, however, the TPM control electronic system can adjust the valve flow to such an extent that the predefined plunger position is not changed. In this case, only the force conditions at the valve change (a greater valve flow is set on account of a higher pressure difference). In this case, the pressure pulses can be determined only by way of the actuating variable which is processed in the control operation or by way of the actual value changes. According to a further preferred embodiment, the flux change is therefore determined via changes in the actuating variables or the actual variables within the TPM control operation.

Moreover, the invention relates to the use of the above-described control device in conjunction with distance control operations (ACC). The control device comprises further control functions, such as at least an antilock brake system (ABS) and electronic stability program (ESP) or possibly further control operations, such as a traction control system (ASR, TCS), etc.

BRIEF DESCRIPTION OF THE DRAWINGS

Preferred embodiments of the present invention are illustrated using figures, in which.

DETAILED DESCRIPTION OF THE INVENTION

Figure 1:
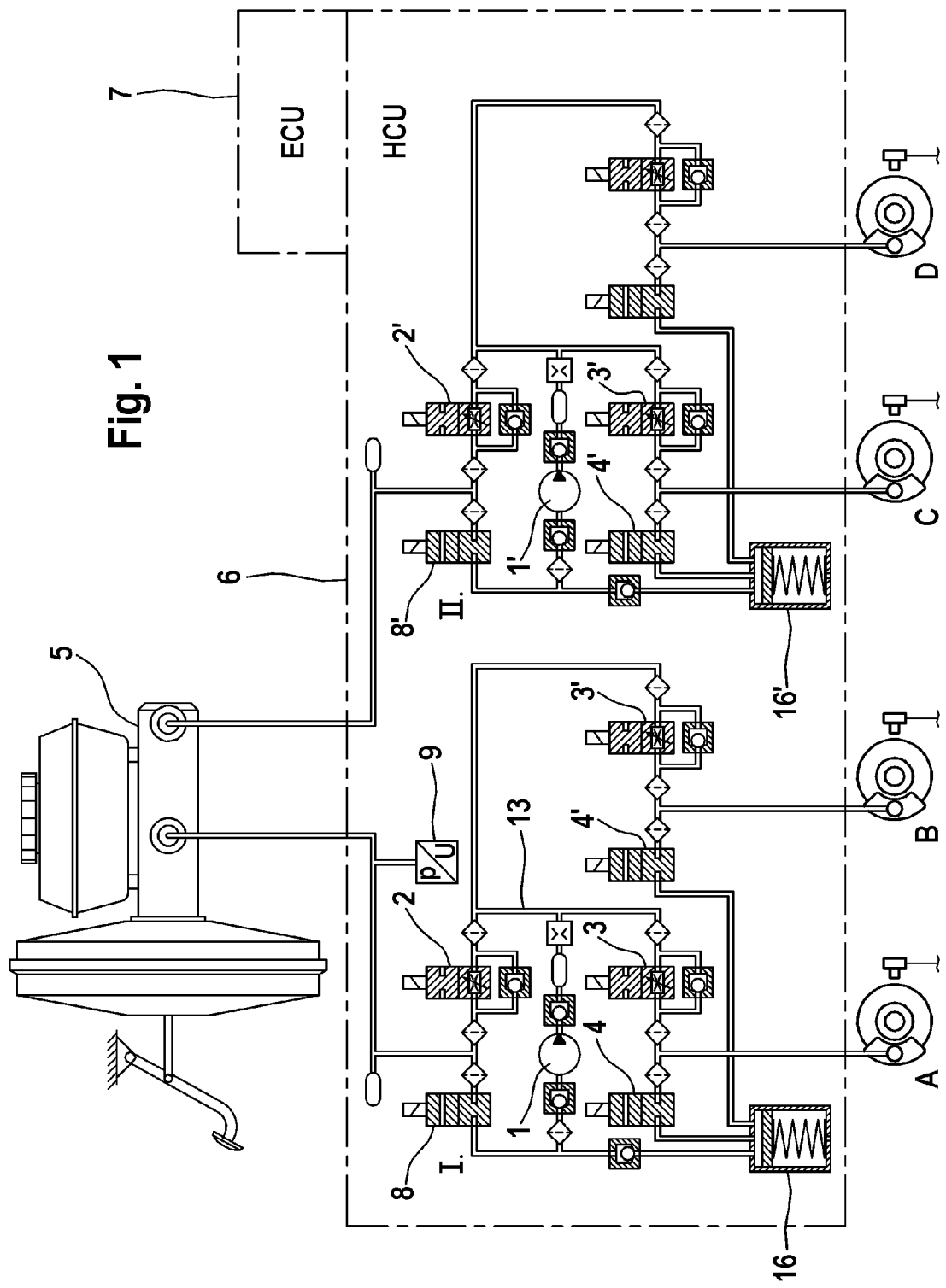
FIG. 1 shows a diagrammatic illustration of a brake device for ABS, TCS, ACC and ESP control operations, and FIGS. 2a) and b) show pressure and valve flow profiles which clarify the influence of the isolating valve current modulation.

In FIG. 1, tandem master cylinder 5 is connected to hydraulic unit 6 (HCU) of an electronic motor vehicle braking system. Electronic unit 7 (ECU) comprises a microprocessor/microcontroller (controller) system, by way of which the actuators and sensors which are contained in the valve block can be controlled and/or measured electronically. Hydraulic unit 6 is divided into two brake circuits I and II, typically associated with front and rear axle brake circuits. Furthermore, each of the brake circuits I and II comprises in each case two wheel pressure circuits (A, B and C, D) with in each case having one inlet valve 3 and 3', and one outlet valve 4 and 4'. The electronic system of the ECU 7 comprises a multiple channel current controller which permits independent control of the currents through the coils of the isolating valves 2, 2' and the inlet valves 3, 3'. Designations 8 and 8' denote electronic switchover valves which are closed in the currentless state (i.e. normally closed). An input pressure sensor 9 is situated in the hydraulic line which leads to master cylinder 5. The braking system which is shown comprises no further pressure sensors in the wheel pressure circuits themselves. Motor/pump assembly 1 and 1' serves for the active pressure build-up of hydraulic brake fluid needed in ACC, TCS and ESP control operations and for returning the pressure medium which is discharged at the outlet valves 4, 4' and is situated in low-pressure accumulator (reservoir) 16 and 16'. When pump assembly 1, 1' is switched on, it conveys pressure volume in the direction of line 13, with the result that the system pressure is increased. On account of the two-cylinder construction of the pump assembly 1, 1' (in one embodiment), the flow of the conveyed volume of hydraulic fluid) pulses at the outlet of the pump, in a pressure range which is dependent on the construction of the hydraulic components.

During a distance control (ACC) operation, pump assembly 1, 1' is actuated by way of a predefined PWM (pulse width modulated) electrical current according to the desired delivery rate and the pressure to be set (predetermined pressure). Isolating valve 2, 2' is operated as an ND valve in a crossflow mode, with the result that the pressure in the wheel brake circuit of the corresponding isolating valve 2, 2' can be controlled for the entire circuit. Here, the valve plunger is held in a suitable intermediate position by the electronic control circuit which is integrated into the ECU 7.

Figure 2:
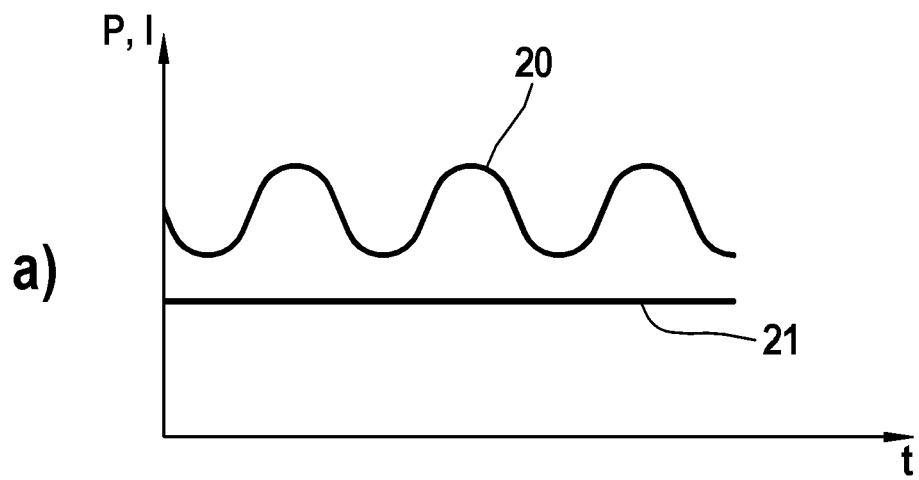
Figure 2:
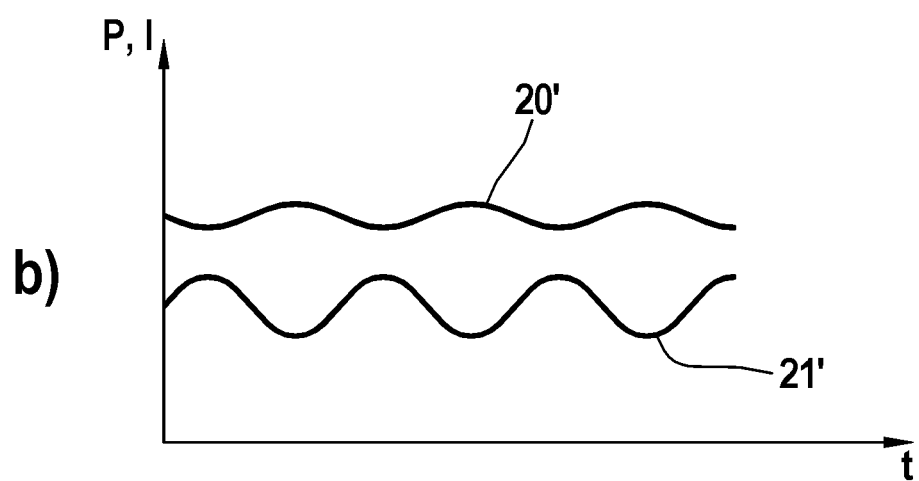

The diagram in FIG. 2a) shows the pressure and valve current profile without the valve current modulation according to the invention. Curve 20 shows the time curve of the wheel pressure, having significant fluctuation. The modulation current, with is applied to isolating valve 2, 2' without the valve current modulation according to the invention, is shown by curve 21.

The diagram in FIG. 2b) shows the pressure and current profile during modulation of the isolating valve current in accordance with the present invention. Curve 21' indicates the curve progression of the isolating valve current. Curve 20' shows the time curve of the wheel pressure with isolating valve modulation. The pressure fluctuations are reduced considerably as shown by curve 20' in comparison with pressure curve 20 in FIG. 2a).

If an ABS or ESP control operation is initiated by a higher-order monitoring means during an ACC control operation (for example, during a critical to safety operation), the periodic actuation of the isolating valve 2, 2' is interrupted until there is again exclusively a request for an ACC control operation.

While the above description constitutes the preferred embodiment of the present invention, it will be appreciated that the invention is susceptible to modification, variation and change without departing from the proper scope and fair meaning of the accompanying claims.

The invention claimed is:

1. An electronic control device comprising a controller which carries out a pressure control operation in a motor vehicle braking system by adjusting electric current driving solenoid valves for pressure control via an electronic unit, the electronic control device comprising:
   a plurality of solenoid valves including at least one wheel brake circuit isolating valve, at least one wheel brake pressure inlet valve, and at least one wheel brake pressure outlet valve,
   a pump assembly actuated as a function of a pressure request that comprises an active pressure build up phase independent of brake actuation by a vehicle driver comprising, wherein the pump assembly generates a volumetric flow of hydraulic brake fluid with a periodically fluctuating amplitude,
   wherein, in response to a control operation that performs an intervention for driving stability comprising a distance control operation for adaptive cruise control, the at least one wheel brake circuit isolating valve, during the active pressure build-up phase, discharges part of the delivery volume of the hydraulic brake fluid in a metered manner into a reservoir volume, if the fluid pressure which is built up by the pump assembly is higher than a predetermined pressure,
   wherein the electric current for the actuation of the at least one wheel brake circuit isolating valve is modulated periodically, the cycle of the modulation corresponding to a cycle of the volumetric or pressure fluctuation which is caused by the pump assembly, wherein the cycles correspond such that the at least one wheel brake circuit isolating valve discharges the part of the delivery volume when the fluid pressure built up by the pump assembly is higher than the predetermined pressure and limits discharging when the fluid pressure built up by the pump assembly is lower than the predetermined pressure, and
   wherein the periodic modulation of the at least one wheel brake circuit isolating valve is interrupted at least when the control device has to carry out an intervention for driving stability comprising control operations of skid control or road handling control.

2. The control device as claimed in claim 1, further comprising in that the modulation is influenced by a signal of a position detection means of the pump assembly.

3. The control device as claimed in claim 1, further comprising in that the cycle for the pressure modulation is derived from the electronic unit for the at least one wheel brake circuit isolating valve.

4. The control device as claimed in claim 1 further comprising in that an electronic evaluation of a plunger position of the at least one wheel brake circuit isolating valve is performed and a change in a magnetic flux is determined via an induction signal of a current loop in a magnetic circuit of the at least one wheel brake circuit isolating valve, the induction signal having signal oscillations, and the signal oscillations of the induction signal are analyzed in order to determine a movement frequency.

5. The control device as claimed in claim 1 further comprising in that the actuating current of the at least one wheel brake circuit isolating valve is adjusted by means of a current controller.

6. The control device as claimed in claim 1 further comprising in that the motor current of an electric motor which actuates the pump assembly is modulated while the motor is revolving.

7. The control device as claimed in claim 1 further comprising in that the pump assembly comprises two reciprocating pistons.

* * * * *